Patented Mar. 6, 1951

2,543,808

UNITED STATES PATENT OFFICE 2,543,808

METHOD OF PREPARING FIBRINOGEN

Walter H. Seegers, Detroit, Eugene C. Loomis, Grosse Pointe Park, and Arnold G. Ware, Royal Oak, Mich., assignors to Parke, Davis & Company, Detroit, Mich., a corporation of Michigan No Drawing. Application December 26, 1946, Serial No. 718,622

14 Claims. (Cl. 167—74)

This invention relates to a highly purified fibrinogen product and to a process for obtaining the same.

Fibrinogen, a protein present in blood plasma, is necessary for blood clotting due to the fact that it is the precursor of fibrin which makes up the framework or body of the clot. Therapeutically fibrinogen is useful in skin grafting procedures since it supplies a clot of high tensile strength thus holding the graft firmly in place.

In the past this valuable protein has been obtained from liquid plasma by precipitation with chemicals such as ammonium sulfate and cold alcohol. In addition to the precipitation of the fibrinogen these processes require that the prothrombin be separated from the fibrinogen by adsorption on a substance such as magnesium hydroxide, thus subjecting the fibrinogen to the denaturizing action of at least two chemical treatments. The considerable and varying denaturization of the fibrinogen which occurs in these processes results in a product of poor and unpredictable purity, solubility and stability characteristics. For example, when ammonium sulfate is used as a precipitant the protein present in the product is only 50 to 70% pure clottable fibrinogen and when alcohol is used the protein of the product contains about 60 to 80% pure clottable fibrinogen. The fibrinogen solutions prepared by these processes are only stable for a matter of hours and rapidly deposit denatured or altered protein. In many instances decomposition is so extensive that the fibrinogen is no longer suitable for therapeutic purposes. This instability may be traced in part to the fact, as mentioned above, that ammonium sulfate and cold alcohol have a tendency to denature fibrinogen and to the fact that even the purest of the known fibrinogen products contain prothrombin or fibrinolysin or both. Moreover, when these fibrinogen solutions are dried by any of the known methods the dry fibrinogen usually fails to redissolve completely in water.

It is an object of the present invention to provide a simple and cheap process for consistently obtaining a highly purified fibrinogen product free of any of the objectionable characteristics commonly or almost always found in the present products.

It is also an object of this invention to provide a process for obtaining a highly purified fibrinogen product which does not involve the use of chemicals to precipitate the fibrinogen.

Another object of the invention is to provide a process for obtaining a highly purified fibrinogen product from blood plasma which does not require the removal of prothrombin.

Still another object of this invention is to provide a method for obtaining a highly purified fibrinogen product from plasma without damaging the other plasma proteins with which fibrinogen is associated.

A further object of the invention is to provide a process for obtaining a highly purified fibrinogen product without large and undue losses of the protein during purification.

Another further object of this invention is to provide solutions of prothrombin-free fibrinogen which are substantially free from fibrinolysin and which are stable for at least several days at room temperature.

A still further object of this invention is to provide a highly purified, dry, prothrombin-free fibrinogen product which is substantially fibrinolysin-free and which readily and completely redissolves in water.

In accordance with the invention frozen human or bovine plasma is melted in such a manner that the fibrinogen is maintained at a temperature of about 0° C. and the fibrinogen which fails to dissolve freed from occluded plasma and other protein impurities by washing with dilute saline at about 0° C. The fibrinogen separated in this manner is dissolved in dilute saline at about 15 to 40° C. to produce a highly purified liquid fibrinogen product, the protein of which is at least 85 to 100% pure clottable fibrinogen. In order to obtain liquid fibrinogen products which are physiologically compatible and contain a high concentration of fibrinogen, we prefer to use physiological saline in our process and to dissolve the washed fibrinogen at a temperature of about 35° C.

The plasma may be melted in a number of different ways but we have found that it is most conveniently and expediently carried out by allowing the plasma to melt while simultaneously withdrawing the liquefied plasma until a substantial amount of fibrinogen adheres to the external surface of the ice cake. The fibrinogen is mechanically removed from the ice cake and the melting process continued, if necessary, until the ice cake becomes so small that it is no longer capable of keeping the residual fibrinogen at the necessary low temperature. When this point is reached the remaining ice cake is added to the plasma filtrate. The purification of the fibrinogen, which has been collected, is carried out as hereinafter described. Another method which has been found to be very convenient consists in allowing the frozen plasma to melt completely at 0° C. or slightly above and then removing the undissolved fibrinogen from the liquidified plasma. The plasma filtrate obtained by either of these melting processes is suitable for use in the preparation of prothrombin and other blood products, because no chemicals have been added nor has it been altered by other means.

The fibrinogen obtained from the plasma is purified by washing it with cold dilute saline. The temperature of the physiological saline during the washing process must be maintained at or close to 0° C. to keep the fibrinogen from dissolving and/or becoming denaturized. The volume of the saline wash liquid is also critical and should not exceed about one-half nor be less than about one-fourth the volume of the lightly packed fibrinogen. If larger quantities are used it has been found that the purity and quantity of the product are greatly decreased whereas if an insufficient amount is used the impurities are not removed. The number of times that the fibrinogen is washed is also important since less than about three washings fail to remove the impurities while more than about six only result in decreasing the yield of the fibrinogen due to its solubility in the saline. The optimal results are obtained when four or five washings are employed.

After the washing has been completed, the washed fibrinogen is converted to the desired liquid fibrinogen product by dissolving it in the minimal quantity of dilute saline at about 15 to 40° C. and then removing any undissolved impurities. The product obtained in this manner is prothrombin-free, substantially fibrinolysin-free and is stable for at least several days at room temperature. It may be frozen and thawed any number of times without causing denaturization or precipitation of the fibrinogen. When dried from the frozen state a white, dry, friable fibrinogen product is obtained which is stable for months and which readily and completely redissolves in water.

The invention is illustrated by the following examples.

Example 1

Five gallons of bovine blood plasma is frozen in the form of a cake and the ice cake placed on a perforated plate covered with a shield. Air at room temperature is blown on the shielded cake and the plasma which melts allowed to run off through the perforated plate into a container below. The fibrinogen adheres to the ice cake as the plasma melts and thus is maintained at 0° C. during the melting process. This melting process is continued until a large quantity of fibrinogen has collected on the ice cake but sufficient ice remains to keep the fibrinogen at or near 0° C. This usually requires about sixteen hours.

The fibrinogen which is a slimy, slightly stringy, white solid is scraped off the ice cake and the residual ice cake added to the effluent plasma. This effluent plasma containing the plasma from the residual ice cake contains all the prothrombin, substantially all of the fibrinolysin and not more than 20 to 30% of the fibrinogen originally present in the plasma.

The collected fibrinogen is freed from occluded plasma and other protein impurities by washing it with dilute salt solutions of which we prefer physiological saline. This is carried out by suspending the fibrinogen in not more than one-half volume of physiological saline at 0° C. and centrifuging the suspension just enough to pack the fibrinogen, e. g. at about 2000 R. P. M. for one minute. The saline wash solution and any floating material are removed and this washing process repeated four times with the same amount of physiological saline.

The residual washed fibrinogen is almost dissolved in physiological saline at 35° C. and centrifuged at 3000 R. P. M. for one and a half to three hours. The clear solution containing the dissolved purified fibrinogen is separated and the solid residual material discarded. The protein present in this clear salt solution is substantially fibrinolysin-free, completely free from prothrombin and is composed of at least 85 to 100% pure clottable fibrinogen. The total yield of the highly purified fibrinogen based on the total amount of fibrinogen present in the plasma is about 30%.

This fibrinogen product is stable at room temperature for several days, e. g. for a minimum of 48 hours. It can be frozen and thawed at 35° C. at least twenty-five times without causing precipitation or denaturization of the protein. This liquid product can be dried from the frozen state to obtain a readily soluble, friable, white fibrinogen preparation which is stable for months. On the addition of water this solid product readily and completely dissolves to produce a liquid fibrinogen preparation similar to the undried product.

Alternatively, the fibrinogen may be isolated from the frozen plasma by allowing the plasma to melt completely in a refrigerator maintained at 0° C. or slightly above. The fibrinogen which remains undissolved after the disappearance of all the ice is physically collected and purified by washing, etc. as described above.

Example 2

Two gallons of fresh human blood plasma is frozen and the frozen mixture placed in a refrigerator at about 0 to 3° C. until it melts completely. The undissolved fibrinogen is collected, washed with five portions (slightly less than one-half volume) of physiological saline at 0° C. and almost dissolved in the minimal amount of physiological saline at 35° C. The liquid fibrinogen product obtained after centrifugation is similar to that obtained in Example 1 in purity and stability. It can be dried from the frozen state to obtain a white, stable, prothrombin-free, substantially fibrinolysin-free fibrinogen product which is readily and completely soluble in water to reproduce a liquid product similar to that used in its preparation.

What we claim as our invention is:

1. Process for obtaining a highly purified fibrinogen product which comprises melting frozen plasma while maintaining the residual fibrinogen at about 0° C., collecting and washing said residual fibrinogen with three to six portions of dilute saline at about 0° C., the volume of said portions of dilute saline being more than about one-fourth but less than about one-half the volume of the residual fibrinogen, dissolving the washed fibrinogen in a minimal quantity of dilute saline at a temperature between 15 and 40° C. and separating the undissolved material from the resulting solution.

2. Process for obtaining a highly purified fibrinogen product which comprises melting frozen bovine plasma while maintaining the residual fibrinogen at about 0° C., collecting and washing said residual fibrinogen with three to six portions of dilute saline at about 0° C., the volume of said portions of dilute saline being more than about one-fourth but less than about one-half the volume of the residual fibrinogen, dissolving the washed fibrinogen in a minimal quantity of dilute saline at a temperature between 15 and 40° C. and separating the undissolved material from the resulting solution.

3. Process for obtaining a highly purified fibrinogen product which comprises melting frozen human plasma while maintaining the residual fibrinogen at about 0° C., collecting and washing said residual fibrinogen with three to six portions of dilute saline at about 0° C., the volume of said portions of dilute saline being more than about one-fourth but less than about one-half the volume of the residual fibrinogen, dissolving the washed fibrinogen in a minimal quantity of dilute saline at a temperature between 15 and 40° C. and separating the undissolved material from the resulting solution.

4. Process for obtaining a highly purified fibrinogen product which comprises melting frozen plasma while simultaneously withdrawing the liquefied plasma and maintaining the residual fibrinogen at about 0° C., collecting and washing said residual fibrinogen with three to six portions of dilute saline at about 0° C., the volume of said portions of dilute saline being more than about one-fourth but less than about one-half the volume of the residual fibrinogen, dissolving the washed fibrinogen in a minimal quantity of dilute saline at a temperature between 15 and 40° C. and separating the undissolved material from the resulting solution.

5. Process for obtaining a highly purified fibrinogen product which comprises melting frozen plasma at about 0° C., collecting and washing the undissolved fibrinogen with three to six portions of dilute saline at about 0° C., the volume of said portions of dilute saline being more than about one-fourth but less than about one-half the volume of the residual fibrinogen, dissolving the washed fibrinogen in a minimal quantity of dilute saline at a temperature between 15 and 40° C. and separating the undissolved material from the resulting solution.

6. Process for obtaining a highly purified dry fibrinogen product which comprises melting frozen plasma while maintaining the residual fibrinogen at about 0° C., collecting and washing said residual fibrinogen with three to six portions of dilute saline at about 0° C., the volume of said portions of dilute saline being more than about one-fourth but less than about one-half the volume of the residual fibrinogen, dissolving the washed fibrinogen in a minimal quantity of dilute saline at a temperature between 15 and 40° C., separating the undissolved material from the resulting solution and drying said solution, after freezing, from the frozen state.

7. Process for obtaining a highly purified fibrinogen product which comprises melting frozen plasma while simultaneously withdrawing the liquefied plasma and maintaining the residual fibrinogen at about 0° C., collecting and washing said residual fibrinogen with three to six portions of physiological saline at about 0° C., the volume of said portions of physiological saline being more than about one-fourth but less than about one-half the volume of the residual fibrinogen, dissolving the washed fibrinogen in a minimal quantity of physiological saline at a temperature of about 35° C. and separating the undissolved material from the resulting solution.

8. Process for obtaining a highly purified fibrinogen product which comprises melting frozen plasma at about 0° C., collecting and washing the undissolved fibrinogen with three to six portions of physiological saline at about 0° C., the volume of said portions of physiological saline being more than about one-fourth but less than about one-half the volume of the residual fibrinogen, dissolving the washed fibrinogen in a minimal quantity of physiological saline at a temperature of about 35° C. and separating the undissolved material from the resulting solution.

9. Process for obtaining a highly purified dry fibrinogen product which comprises melting frozen plasma while maintaining the residual fibrinogen at about 0° C., collecting and washing said residual fibrinogen with three to six portions of physiological saline at about 0° C., the volume of said portions of physiological saline being more than about one-fourth but less than about one-half the volume of the residual fibrinogen, dissolving the washed fibrinogen in a minimal quantity of physiological saline at a temperature of about 35° C. and separating the undissolved material from the resulting solution and drying said solution, after freezing, from the frozen state.

10. Process for obtaining a highly purified fibrinogen product which comprises applying moderate heat to frozen blood plasma to melt the same thereby producing liquefied plasma and undissolved solid fibrinogen, maintaining said solid fibrinogen at a temperature about 0° C. during the melting, collecting and washing said undissolved solid fibrinogen with three to six portions of dilute saline at about 0° C., the volume of said portions of dilute saline being more than about one-fourth but less than about one-half the volume of said fibrinogen, dissolving the washed fibrinogen in a minimal quantity of dilute saline at a temperature between 15 and 40° C. and separating the undissolved material from the resulting solution.

11. In a process for obtaining a highly purified fibrinogen product, the steps which comprise freezing blood plasma into a frozen mass, applying moderate heat to said frozen mass to melt the same thereby producing liquefied plasma and undissolved solid fibrinogen, maintaining said solid fibrinogen at a temperature about 0° C. during the melting, and separating said solid fibrinogen from said liquefied plasma before the temperature of said solid fibrinogen is permitted to rise substantially above 0° C.

12. In a process for obtaining a highly purified fibrinogen product, the steps which comprise freezing blood plasma into a frozen mass, applying moderate heat to said frozen mass at a temperature not substantially above 0° C. to completely melt the same thereby forming a mixture of liquefied plasma and undissolved solid fibrinogen, and separating said solid fibrinogen from said liquefied plasma before the temperature of said solid fibrinogen is permitted to rise substantially above 0° C.

13. In a process for obtaining a highly purified fibrinogen product, the steps which comprise freezing blood plasma into a frozen cake, applying heat to said cake to partially melt the same and allow the liquefied plasma thereby produced to flow downwardly while the solid residual fibrinogen also produced adheres to the remaining frozen cake, and removing the adherent fibrinogen from the remaining frozen cake before the latter is completely melted.

14. In a process for obtaining a highly purified fibrinogen product, the steps which comprise freezing blood plasma into a frozen cake, blowing air at room temperature over said cake while shielding the latter from direct contact, allowing the liquefied plasma produced during the melting to flow downwardly while permitting the residual fibrinogen to adhere to the remaining frozen cake, and removing the adherent fibrinogen from the remaining frozen cake before the latter is completely melted.

WALTER H. SEEGERS.
EUGENE C. LOOMIS.
ARNOLD G. WARE.

REFERENCES CITED

The following references are of record in the file of this patent:

UNITED STATES PATENTS

| Number | Name | Date |
|---|---|---|
| 2,176,004 | Reichel | Oct. 10, 1939 |

OTHER REFERENCES

Chanoz et al., Comptes Rendus, vol. 52 (1900) pp. 453–4.

Piedelievre, Annales Societe de Medecine Legale (1938) pp. 206–8.

Greaves, Jour. Am. Med. Assn. (Jan. 8, 1944) vol. 124, pp. 76–79 (Espg. p. 77).

Edsall et al., J. Clin. Investigation (July 1944) vol. 23, pp. 557–565 (Espg. 558–9).

Gutman Modern Drug Encyclopedia 2nd ed., page 254, New and Modern Drugs, N. Y. 1949.

Kekwick, Nature, May 11, 1946, page 269.

Neurath et al., J. Urology, April 1943, pages 497–502.

Florkin, J. Biol. Chem., volume 87, pages 629–649.